(12) United States Patent
Chaney

(10) Patent No.: US 9,402,349 B2
(45) Date of Patent: Aug. 2, 2016

(54) CALIBRATION OF TENSIONING SYSTEM

(71) Applicant: Deere & Company, Moline, IL (US)

(72) Inventor: Nathan A. Chaney, Bloomfield, IA (US)

(73) Assignee: Deere & Company, Moline, IL (US)

( * ) Notice: Subject to any disclaimer, the term of this patent is extended or adjusted under 35 U.S.C. 154(b) by 76 days.

(21) Appl. No.: 14/259,513

(22) Filed: Apr. 23, 2014

(65) Prior Publication Data

US 2015/0305247 A1    Oct. 29, 2015

(51) Int. Cl.
*A01F 15/14* (2006.01)
*G01B 7/00* (2006.01)

(52) U.S. Cl.
CPC ............... *A01F 15/148* (2013.01); *G01B 7/00* (2013.01)

(58) Field of Classification Search
CPC .............................. A01F 15/148; G01B 7/00
See application file for complete search history.

(56) References Cited

U.S. PATENT DOCUMENTS 4,196,661 A    4/1980    Yatcilla et al.
4,765,235 A *  8/1988    Schrag et al. ............... 100/3
8,495,956 B1   7/2013    Demulder et al.
8,671,834 B1   3/2014    Rotole et al.
2013/0118366 A1  5/2013  Esau et al.

FOREIGN PATENT DOCUMENTS

EP    0286900 A1    10/1988
EP    0857414 A1    8/1998

OTHER PUBLICATIONS

John Deere, 1400 Series Large Square Balers Brochure, Nov. 2010.
European Search Report issued in counterpart application No. 15164073.7, dated Sep. 15, 2015 (5 pages).

* cited by examiner

*Primary Examiner* — Fadey Jabr
*Assistant Examiner* — Basil T Jos
(74) *Attorney, Agent, or Firm* — Ingrassia, Fisher & Lorenz PC

(57) ABSTRACT

A sensor assembly and method are described for calibrating a tensioning system. A first movement of a slack arm of the tensioning system may be identified. It may be determined that the slack arm has been maintained in a first calibration position for a first predetermined time interval, and a first calibration setting for the slack arm may be determined based upon the first calibration position. A second movement of a slack arm of the tensioning system may be identified. It may be determined that the slack arm has been maintained in a second calibration position for a second predetermined time interval, and a second calibration setting for the slack arm may be determined based upon the identified second calibration position.

20 Claims, 5 Drawing Sheets

CALIBRATION OF TENSIONING SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the calibration of moving components, including slack arms for twine-tensioning systems of agricultural balers.

BACKGROUND OF THE DISCLOSURE

In various agricultural and other settings, it may be useful to form bales of crop (and other) material. Various machines or mechanisms may be utilized to gather material (e.g., from a windrow along a field) and process it into bales. The formed bales may have various sizes and, in certain applications, may exhibit generally rectangular (or other) cross-sections. In order to create rectangular bales, for example, a square baler may travel along a windrow of cut crop material gathering the material into a generally rectangular baling chamber. A reciprocating plunger or other mechanisms may compress the crop material into bales, which may then be tied with twine or similar material before being ejected from the back of the baler. Such tying may help to ensure that the bales retain their shape after being ejected from the baler.

In order to appropriately tie the formed bales, various balers may include knotter assemblies for tying twine (or similar material). In turn, various knotter assemblies may include tensioning systems for maintaining appropriate tension on the twine during this tying (or during other operations). For various reasons, it may be useful to monitor the operation of certain components of such a tensioning system (or of similar systems included in other machines).

In certain traditional balers, physical flags were attached to various slack arms of knotter assembly such that the flags moved up and down with the slack arms in order to provide an operator of a baler with a visual indicator of the slack arm movement. In certain balers, these physical flags have been replaced with electronic monitoring devices.

SUMMARY OF THE DISCLOSURE

A calibration system and computer-implemented method are disclosed for calibration operations, including calibration of one or more slack arms in a tensioning system of a baler or other machine.

According to one aspect of the disclosure, a first movement of a slack arm of the tensioning system may be identified. It may be determined that the slack arm has been maintained in a first calibration position for a first predetermined time interval, and a first calibration setting for the slack arm may be determined based upon the first calibration position. A second movement of a slack arm of the tensioning system may be identified. It may be determined that the slack arm has been maintained in a second calibration position for a second predetermined time interval, and a second calibration setting for the slack arm may be determined based upon the second calibration position.

In certain implementations, a sensor may be provided in communication with the slack arm, and various operations executed based upon signals from the sensor. The first or second movement of the slack arm may be identified based upon a voltage change in a signal from the sensor. The maintaining of the slack arm in the first or second calibration positions may be determined based upon a voltage signal from the sensor deviating from a reference voltage by less than a predetermined number of volts over the first or second predetermined time interval.

In certain embodiments, aural or visual indicators may be provided with regard to various calibration operations. An indicator of a current slack arm position may be displayed during operation of the tensioning system based upon the first and second calibration settings.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
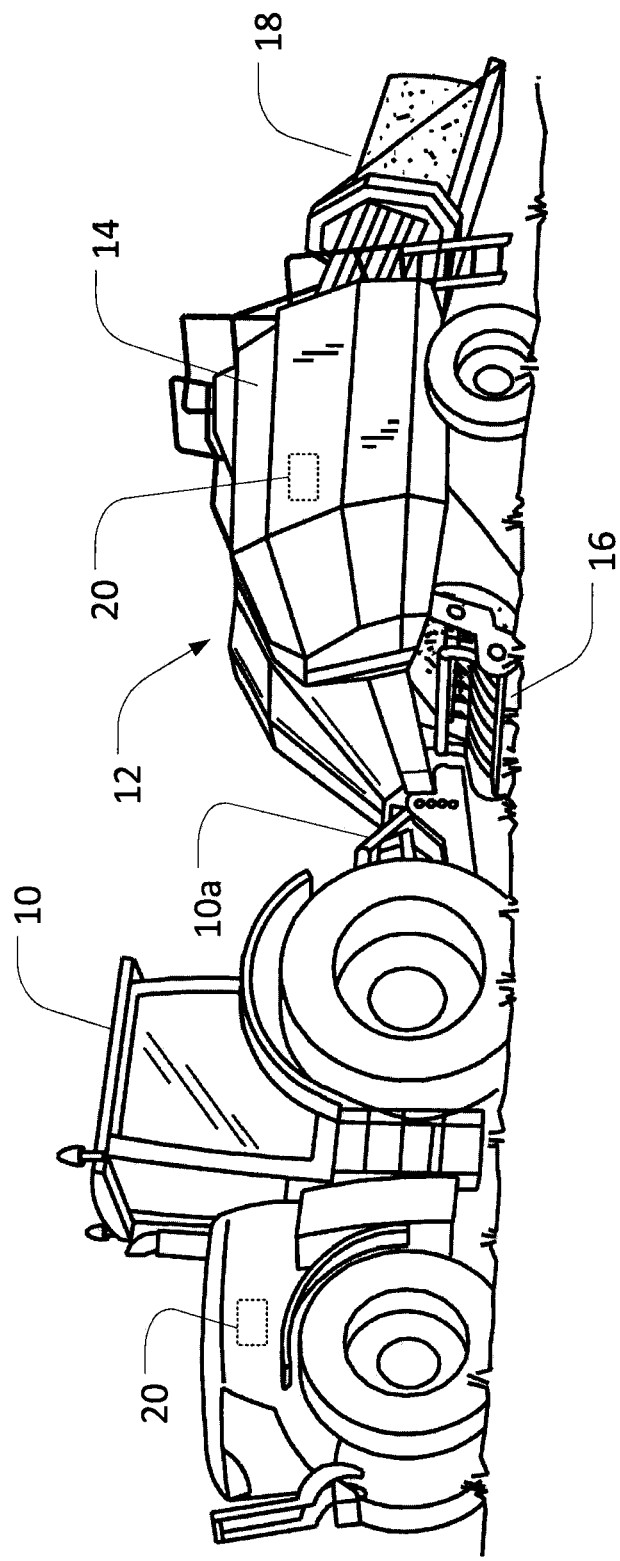
FIG. 1 is a perspective view of an example baler towed by a work vehicle.

The following describes one or more example embodiments of the disclosed calibration system and computer-implemented method, as shown in the accompanying figures of the drawings described briefly above. Various modifications to the example embodiments may be contemplated by one of skill in the art, including implementation of the disclosed method through a special-purpose computing system employing one or more processor devices and memory architectures.

As noted above, it may be useful in various circumstances to gather loose material, such as cut crop material, into compacted bales. In certain embodiments, such material may be gathered and compacted into bales, then tied with twine or similar material. For example, cut crop (or other) material may be gathered from windrows along a field by a square baler and passed into a baling chamber for compression into square bales. Once a particular bale has been formed, a knotter assembly of the baler may then be utilized to tie the formed bale with twine or other materials before the bales are ejected from the baling chamber.

Such a knotter assembly (or other similar systems) may include one or more tensioning systems, which may ensure that twine (or other tying material) is maintained at an appropriate tension during operation of the knotter (or other) system. In various embodiments, a tensioning system (in a baler or otherwise) may include slack arms in order to control the tension of the twine or other material during a knotting (or other) operation. The movement (or lack of movement) of these slack arms may provide a useful indicator of the state of the tensioning system (and knotter assembly), including whether various lines of twine are appropriately configured and intact. Accordingly, it may be useful to provide one or more monitoring systems for the slack arms, which systems may need to be appropriately calibrated.

In certain embodiments, a slack arm providing tensioning force to twine (or similar material) may be in communication with a sensor (e.g., a potentiometer) that measures the position of the slack arm. The sensor may provide a voltage (or other) signal to a controller (e.g., one or more computing device) based upon the current position of the associated slack arms, which may be translated by the controller into an actual position measurement, thus facilitating the monitoring of the slack arms by the controller or other associated devices.

In order to ensure appropriately accurate translation of signals from a sensor into assessments of actual slack arm position, it may be useful to calibrate a sensor with respect to an associated slack arm (referred to herein simply as "calibrating a slack arm" and the like). In certain implementations, this may be accomplished by a sequence of slack arm movements, and controller operations. For example, one or more slack arms may be moved between various calibration positions (e.g., manually, by a baler operator). The controller may identify these various movements and positions, and associate them with corresponding signals from the controller in order to allow later, different signals from the sensor to be translated into appropriate, different positions.

Various issues may arise with regard to such a calibration. For example, because a sensor signal to be used for calibration may need to be associated with a known position of slack arm (i.e., a calibration position) in order to establish an appropriate calibration setting (e.g., an appropriate pairing of a known calibration position with a particular sensor signal), it may be important to determine calibration positions of a slack arm accurately and to accurately determine that a sensor is actually at that position when the sensor signal for calibration is assessed. Further, it may be necessary to compensate for various accidental, incidental, or other movements of a slack arm during a calibration process, without allowing those non-pertinent movements to adversely affect the determination of a calibration setting. The sensor assembly and associated method described herein may usefully address this and other needs.

In certain implementations, as an operator first begins to move a particular slack arm associated with a particular sensor (e.g., begins to move the slack arm manually towards a first extremum of its range of motion), the controller may identify the movement of the slack arm based upon a signal from the associated sensor. For example, the controller may receive a voltage signal from a potentiometer corresponding to the relative position of a slack arm, and may identify a change in that signal as corresponding to movement of the slack arm by the operator. This may indicate the start of calibration procedure for that slack arm, or otherwise identify that slack arm as being the current subject of a calibration process. In certain embodiments, such a slack arm movement may be identified only if it is a movement of sufficient magnitude, corresponding to a change in the sensor signal (e.g., in the signal voltage) of a certain amount.

Once this initial movement of the slack arm has been identified, the controller may then wait to identify a steady signal from the sensor, which may be interpreted to indicate that the slack arm is being maintained in a particular position following the identified movement. For example, after identifying the initial slack arm movement the controller may wait to identify a voltage signal from a sensor associated with the slack arm that varies by only a small amount over a predetermined amount of time. This relatively steady signal may correspond to the slack arm being held in a particular position, and may be interpreted as such by the controller.

Further, where a maintained position of the slack arm may be viewed as corresponding to a predetermined calibration position (e.g., an extremum of the slack arm's pivot range), the controller may determine a first calibration setting for the slack arm based upon the steady sensor signal and the calibration position. For example, in a particular calibration method, an operator may be instructed to move a slack arm to a first calibration position (e.g., an upper extremum of its pivot range) and hold the slack arm at that position for at least particular amount of time. A controller may identify the initial movement of the slack arm based upon a change in a signal from an associated sensor, wait until a steady signal from the sensor indicates that the slack arm has been maintained in position for the appropriate interval, then treat the steady signal from the sensor as essentially corresponding to the first calibration position.

Next, the operator may move the particular slack arm toward another calibration position (e.g., a second extremum of the slack arm's range of motion), and the controller may generally repeat the operations above to determine a second calibration setting corresponding to the second calibration position and associated sensor signal. In this way, for example, the controller may determine at least two calibration settings for a slack arm and an associated sensor, which may be used to interpret signals from the sensor during actual operation of the slack arm in order to identify the current slack arm position.

As needed, various of these operations may then be repeated (or may be executed simultaneously) with respect to various other slack arms and sensors, in order to appropriately calibrate the tensioning system. For example, for an upper tensioning system of a baler with six slack arms, an operator may sequentially and manually move each slack arm to an upper (or lower) stop, hold the slack arm at the stop for a predetermined amount of time, move the slack arm to a lower (or upper) stop, and hold the slack arm at the stop for a predetermined amount of time. The controller, accordingly, may identify at least two calibration settings for each of the slack arms (i.e., calibration settings corresponding, respectively, to the upper and lower stops of each of the slack arms and the associated sensor signals), thereby allowing for accurate subsequent monitoring of the operational movement of the slack arms.

Referring now to FIG. 1, a large square baler 12 may be towed across a field by an agricultural vehicle 10. (It will be understood that various other configurations are also possible. For example, the disclosed calibration system and method may be utilized with a variety of other balers or other types of equipment.) The baler 12 may include a housing 14, which may generally shield various internal components of the baler 12. As the baler 12 moves across a field (e.g., as towed by the vehicle 10 via a connection 10a) and encounters a windrow or other arrangement of material (not shown), a pick-up assembly 16 may gather the material and move it up and into a housing 14 for processing. As a result of this processing, a bale 18 may be formed. Before the formed bale 18 is ejected from the housing 14, the bale 18 may be tied with twine (or other material) by a knotter assembly 30 (not shown in FIG. 1) within the housing 14.

In various embodiments, the baler 12 (or the vehicle 10) may include one or more computing devices, such as a controller 20. Various possible locations for the controller 20 are depicted in FIG. 1, including locations on the vehicle 10 and the baler 12. It will be understood, that one or more controllers 20 may be employed and that the controller 20 may be mounted at various locations on the vehicle 10, the baler 12, or elsewhere. The controller 20 may be a computing device of various designs, and may be configured to execute various computational and control functionality with respect to the baler 12 (or the vehicle 10). To this end, the controller 20 may be in electronic or other communication with various components and devices of the baler 12 (or the vehicle 10). For example, the controller 20 within the baler 12 may be in electronic communication with various actuators, sensors, and other devices within (or outside of) the baler 12, including various sensors within the knotter assembly 30 (see FIG. 2). The controller 20 may communicate with various other devices (including other controllers) in various known ways, including via a CAN bus (not shown) of the vehicle 10 or the baler 14, wirelessly, or otherwise.

Figure 2:
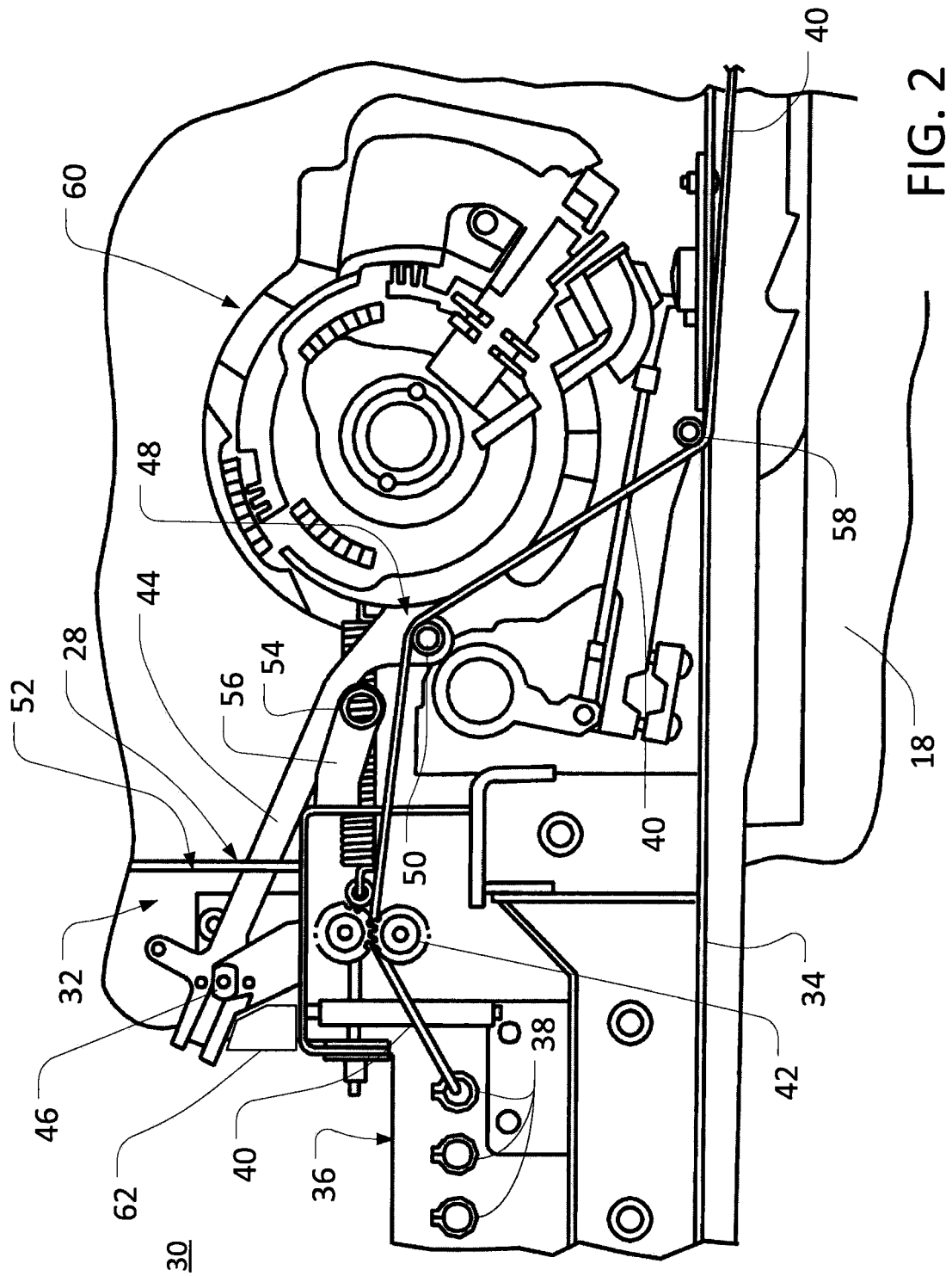
FIG. 2 is a side view of portions of a tensioning system of the baler of FIG. 1.

Referring now also to FIG. 2, various internal components of the example knotter assembly 30 for the baler 12 are depicted, including various components of a tensioning system 32. (Again, it will be understood that various other configurations are also possible. For example, the disclosed calibration system and method may be utilized with a variety of other knotter assemblies, tensioning systems, or other types of equipment.) The tensioning system 32 is depicted as an upper tensioning system, generally mounted in an upper portion of the baler 12. In certain configurations, similar (or other) tensioning systems may also be provided in a lower portion of the baler 32 or elsewhere. It will be understood that the disclosed calibration system and method may be utilized with an upper tensioning system only, with a lower tensioning system only, with various combinations or upper, lower and other tensioning systems, including tensioning systems mounted on opposite sides of the baler 32, and so on.

The tensioning system 32 may include a housing 34 which may generally be a sheet-like frame surrounding the system 32 and providing mounting points or features for various fixed and articulated components of the system 32. The system 32 may also include (e.g., outside the housing 34) an appropriate storage space 36 for balls of twine (or other arrangements of tying material). Twine balls may be stored, for example, in twine boxes (not shown) on the side of the baler 12. As illustrated, there may be multiple eyelets or twine guides 38, each for routing a separate length of twine 40 from the storage space 36 into the tensioning system 32 (and, generally, the knotter assembly 30). Although three twine guides 38 are shown, it should be understood that any number of guides 38 may be employed. In the discussion below, a single path of the twine 40 may sometimes be described. It will be understood that similar other paths (not shown) may be utilized for other lengths of twine 40, which paths may, for example, be adjacent to and generally parallel with each other, or other twine paths (not shown).

Upon entering the housing 34, the twine 40 may first pass through a twine tensioner 42, which may provide tension to the twine 40 as upper and lower lengths of the twine 40 are carried by the forward edge of a particular bale 18 through the baler 12. The twine 40 may then pass across a slack arm 44 which may be pivotally mounted to housing 34 at pivot point 46. The slack arm 44 may be biased upward (from the perspective of FIG. 2) by a spring or other element (not shown) and may generally include a journalled (or other) guide for the twine 40 at a twine end 48 of the slack arm 44. As depicted, such a guide may be configured as a pulley 50. It will be understood, however, that other configurations may be possible, including eyelet guides or other guide designs.

A potentiometer 60 (e.g., a rotational or linear potentiometer) or other sensor of various known configurations (e.g., Hall effect or other magnetic sensors, optical sensors, and so on) may be in communication with the slack arm 44 in order to output a voltage (or other) signal depending upon the current orientation of the slack arm. Such a signal may be communicated, for example to the controller 20 (see FIG. 1) or another device for appropriate processing.

From the twine end 48 of the slack arm 44, the twine 40 may extend to a lower pulley or guide 58 then along the lower end of the housing 34 and around the bale 18 as the bale 18 (a portion of which is illustrated in FIG. 2) moves through the baling chamber of the baler 12. When the bale 18 is fully formed, a knot tying and twine severing mechanism 60 may then tie a knot (not shown) between various lengths of the twine 40 to secure the twine 40 around the bale 18 and prepare for the tying of a subsequent bale (not shown). Various balers 12 may employ one-knot, two-knot or other knotter assemblies 30. In a two-knot version of the knotter assembly 30, the mechanism 60 may tie two knots (not shown), one of which may be at the forward end of a current bale 18 (from the perspective of the baler 12) and the other of which may be at the rearward end of a subsequent bale (not shown). A knife (not shown) may then cut the twine 40 to disconnect the tied knot(s) from the twine balls (not shown).

The slack arm 44 may pivot about the pivot point 46 in order to appropriately tension the twine 40 during operation of the knotter assembly 30. For example, in certain embodiments, the force required to pull the twine 40 through the tensioner 42 may be larger than the force required to overcome the biasing force on the slack arm 44 and thereby move the slack arm 44 into contact with the stop bar 54. This may ensure that the appropriate tension is maintained on the twine 40 as the twin is fed through the tensioning system 32 and knotter assembly 30. When the knotting process is being performed by the tying and severing mechanism 60, twine may no longer be moving through (or moving as quickly through) the twine tensioner 42 and the tensioner 42, accordingly, may no longer operate to appropriately tension the twine 40. Accordingly, the slack arm 46 may pivot upwards, under the urging of the spring or other biasing element (not shown) to maintain appropriate tension on the twine 40.

The range of this pivoting of the slack arm 46 may be limited in various ways. For example, the pivot range of the slack arm 46 may be limited at an upper end by a stop 52 formed in the housing 34 (e.g., the stop 52 at an upper end of a pivot slot 28 in the housing 34), and at a lower end by a stop bar 54 supported by arms 56. Other types of stops (not shown) for the slack arm 44 may additionally (or alternatively) be employed, with similar or different configurations as the stop 32 and the stop bar 54. (As used herein, words such as "upper," "lower" and the like may be used for convenience. It will be understood that these positional references may be used with respect to the relative position of components of an example embodiment depicted with a particular orientation and are not intended to limit the disclosure to embodiments having that particular orientation.)

As noted above, during operation of the knotter assembly 30 and the tensioning system 32, the various slack arms 44 may pivot up and down around the pivot point 46 in accordance with the various cycles of the knotter assembly 30 and the tensioning system 32. It may be useful to provide to an operator of the vehicle 10 (or various others) information regarding this movement of the slack arms 44. For example, during operation of the knotter and tensioning systems 30 and 32, the slack arms 44 may pivot up and down in a relatively regular and predictable way so long as all lengths of twine 40 are intact (i.e., not broken) and appropriately engaged (i.e., appropriately wound through the knotter assembly 30 and tensioning system 32). Accordingly, an operator may monitor such pivoting movement of the slack arms 44, or an indicator thereof, in order to identify irregular (or absent) pivoting and thereby identify potential issues with the twine 40. For example, if an operator determines that a particular slack arm 44 is stuck at the top of its pivot range, this may indicate that the twine 40 associated with that slack arm 44 has broken and needs to be addressed. Similarly, if an operator determines that a particular slack arm 44 is stuck at the bottom of its pivot range, this may indicate a "hang-up" condition, in which twin 40 associated with that slack arm 44 hasn't cleared a billhook (not shown) of the knotter assembly 30, which may indicate imminent damage to the billhook of other system components.

An operator may be apprised of the pivoting movements of the various slack arms 44 in a variety of ways. For example, as noted above, various potentiometers 62 (or other sensors) may monitor various of the slack arms 44 and output a voltage (or other) signal to the controller 20 (or another device) corresponding to the current position(s) (or other characteristic(s)) of the slack arms. The controller 20 may analyze these signals and provide various displays or other indicators (e.g., aural indicators) to inform the operator of the slack arm 44 orientations.

Figure 3:
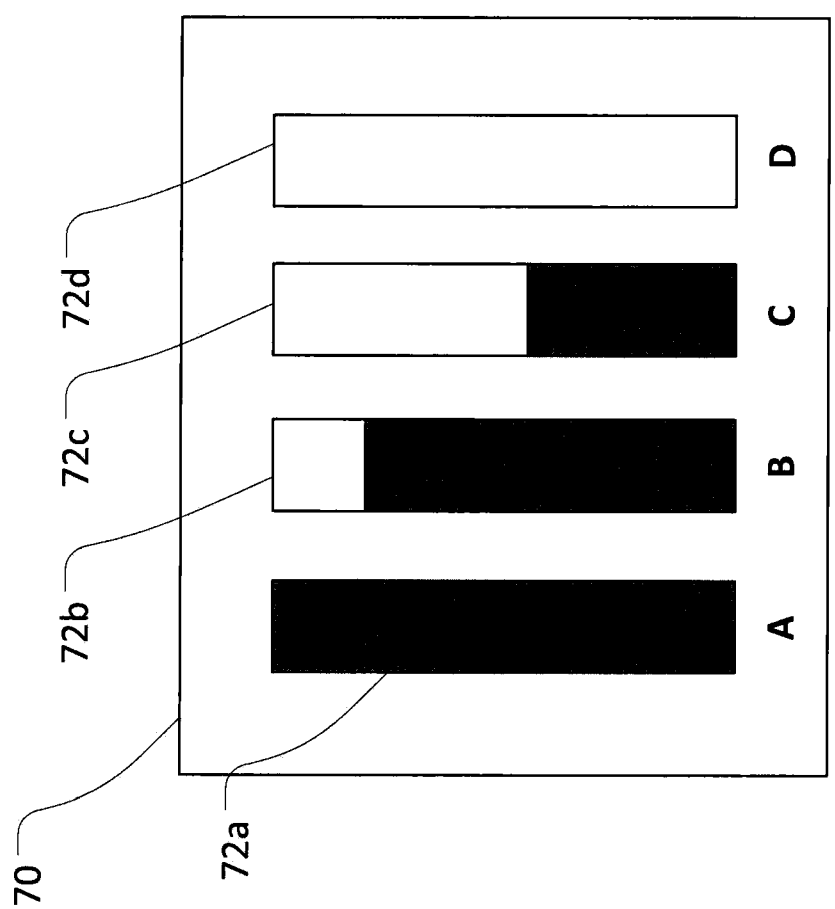
FIG. 3 is a schematic view of a display device for the baler or work vehicle of FIG. 1.

Referring also to FIG. 3, for example, a display device 70 in the cab of the vehicle 10 may display a bar indicators 72a-d for, respectively, each of four slack arms 44 of the baler 12. As depicted, the various bar indicators 72a-d may be displayed on the display device 70 as being "filled" in proportion to the relative orientation of the corresponding slack arm 44 with respect to the upper and lower extrema of its pivotal movement. For example, in FIG. 3, a slack arm "A" is depicted in as being fully at the stop 52, a slack arm "D" is depicted as being fully at the stop bar 54, and slack arms "B" and "C" are depicted as being between the stop 52 and the stop bar 54. It will be understood that other configurations of the display on display device 70, and other types of indicators of the position of the slack arms 44 may be possible.

As also noted above, in order to provide appropriately accurate indicators of the positions of the slack arms 44 during operation of the tensioning system 32, it may be useful to calibrate the potentiometers 62 (or other relevant sensors). Through appropriate calibration, for example, signals received from a sensor associated with a particular slack arm 44 may be accurately interpreted by the controller 20 as indicating a particular orientation of the slack arm 44. Accordingly, and referring also to FIGS. 4A, 4B, and 5, a slack arm calibration ("SAC") method such as SAC method 200 may be useful. In certain implementations, the SAC method 200 may be executed in whole or in part by various computing devices, such as controller 20.

Figure 4A:
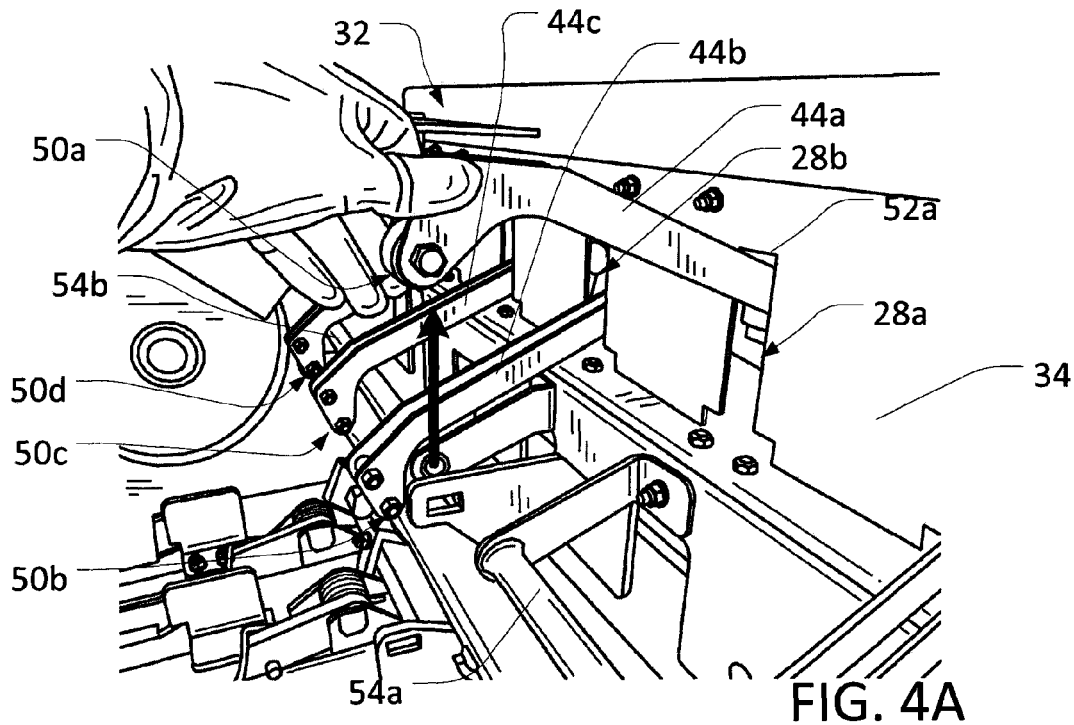
FIGS. 4A and 4B are perspective views of the manual articulation of a slack arm of the tensioning system of FIG. 2.
Figure 4B:
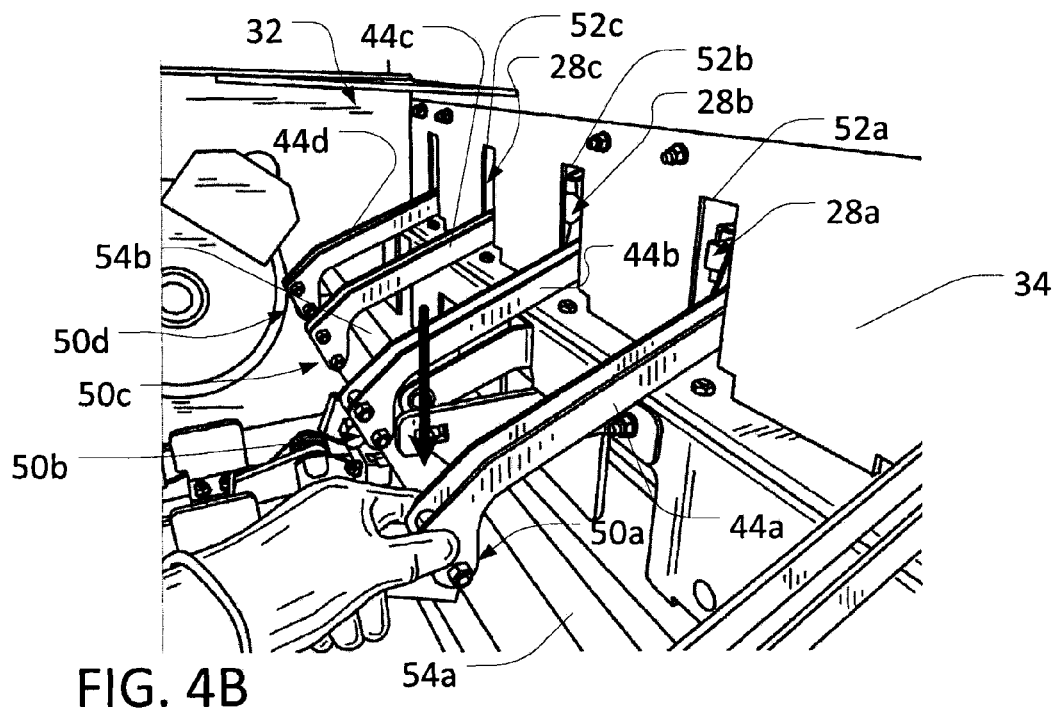
Figure 5:
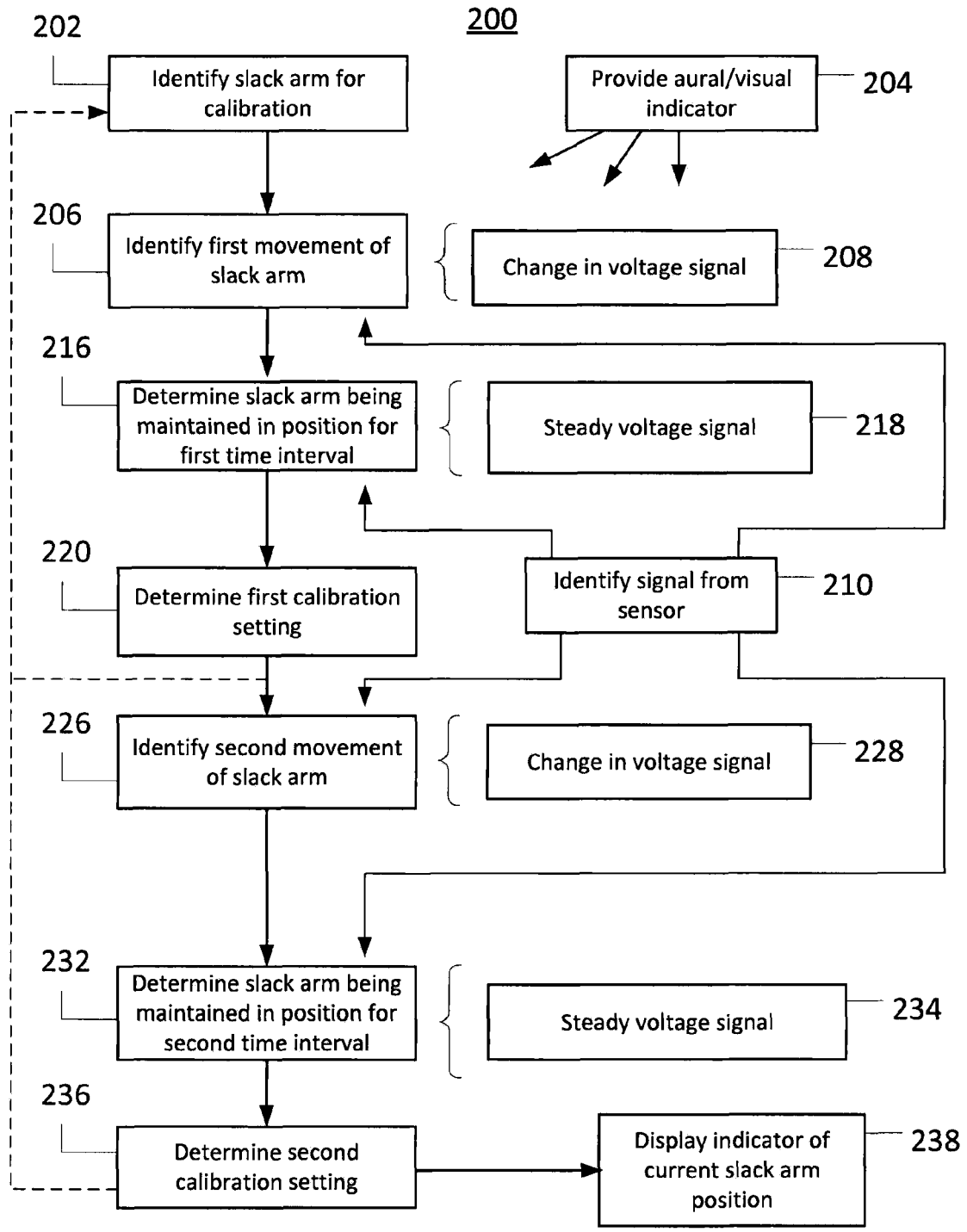
FIG. 5 is a diagrammatic view of a slack arm calibration method that may be implemented with respect to the tensioning system of FIG. 2.

The SAC method 200 may be executed at various times, with regard to a variety of mechanisms, and in a variety of settings. For example, it may be useful to calibrate a tensioning system 32 (or various components thereof) upon installation of the tensioning system 32 in a baler 12 in a factory setting. It may also be useful to calibrate a tensioning system 32 (or various components thereof) in non-factory settings. For example, if an operator or technician replaces or otherwise adjusts a slack arm 44, slack arm sensor (e.g., potentiometer 62), or other component for a baler 12 that is already in service, it may be useful execute the SAC method 200 with respect to the replaced slack arm 44, sensor, or other component. Generally, the SAC method 200 may be performed when the tensioning system 32 is not operating, although other implementations may be possible. FIGS. 4A and 4B depict the tensioning system 32 without the twine 40. It will be understood, however, that a SAC method, such as the SAC method 400, may be implemented with or without the twine 40 being present in the system 32.

The SAC method 200 may be initiated in a variety of ways. In a factory setting, for example, an operator may directly activate an embedded controller 20 or a separate calibration controller (not shown) in order to start the SAC method 200. In an in-field or other calibration, an operator may initiate the SAC method 200 via a computing interface within the cab of the baler 12 (e.g., an interface associated with the display device 70) or elsewhere (e.g., at a computing interface included on the baler 12 itself). The operator may then exit the cab of the baler 12 (as appropriate), in order to perform various operations associated with the SAC method 200, as described in greater detail below.

In certain embodiments, the display device 70 (or another device) may provide instructions and indicators of various sorts to the operator to facilitate efficient execution of the SAC method 200. For example, various aural or visual indicators may be provided 204 by display device 70 or another device, in order to instruct the operator to execute various actions, alert the operator to the start or completion of various operations of the SAC method 200, or otherwise communicating useful information.

The SAC method 200 may include identifying 202 a slack arm 44 for calibration (e.g., slack arm 44a in FIGS. 4A and 4B). In certain implementations, a single slack arm 44 may be identified 202. In certain implementations, multiple slack arms 44 may be identified 202, for sequential calibration or simultaneous calibration, in various orders and combinations. In certain implementations, the particular slack arms 44 identified 202 for calibration may depend on the purpose of a particular calibration effort. In an initial, in-factory calibration, for example, it may be useful to calibrate each slack arm 22 (or each upper slack arm 22) of the tensioning system 32. In contrast, where only a subset of slack arms 22 or associated components have been modified since a previous calibration, it may be useful to calibrate only the modified slack arms 44.

In certain implementations, the display device 70 (or other device) may allow an operator to select a particular slack arm 44, or a set or sequence of slack arms 44 for calibration, and \the SAC method 200 may identify 202 a particular slack arm 44 or set or sequence of slack arms 44 for calibration accordingly. In certain implementations, a predetermined (e.g., pre-programmed) set or sequence of slack arms 44 (e.g., each slack arm 44 in turn, or each upper slack arm 44 in turn) may be identified 202 for calibration. In certain implementations, an aural or visual indicator (e.g., a beep, spoken indicator, other sound, or visual display) may be provided 204 in order to confirm that a particular slack arm 44 or sequence of slack arms 44 has been identified 202 for calibration.

The SAC method 200 may also include identifying 206 a movement of the identified 202 slack arm 44, which may, in certain implementations, effectively "prime" the SAC method 200 for further operations addressing that particular slack arm 44. An identified 206 movement may be a movement in either of the pivot directions of a slack arm 44. Referring in particular to FIG. 4A, for example, where the slack arm 44a is to be calibrated by first moving the slack arm 44a to a calibration position corresponding to the upper stop 52a (e.g., as depicted in FIG. 4A) or other upper location, the identified 206 movement may be a upward movement of the slack arm 44a toward the upper stop 52a (e.g., as manually executed by an operator). This movement of the slack arm 44a may result in a voltage change 208 in a signal from the potentiometer 62 (not shown in FIG. 4A), which may allow the identification 206 of the slack arm movement.

In certain implementations, other movement of the slack arm 44a may additionally (or alternatively) be identified 206. For example, movement of the slack arm 44a may be identified 206 based upon an operator moving the slack arm 44a downward toward the stop bar 54a. This may be useful, for example, if the target calibration position is at the upper stop 52a, but the slack arm 44a is already urged into the upper stop 52a at the initiation of the SAC method 200 (e.g., if an associated twine has broken). In such a case the operator may, for example, move the slack arm 44a downward toward the stop bar 54a to allow identification 206 of the slack arm 44a for calibration before the slack arm 44a is moved back toward the upper stop 52a.

In certain implementations, a slack arm movement may be identified 206 based upon identifying a voltage (or other) change 208 in an identified 210 sensor signal of at least a particular threshold amount, in order to avoid false, premature, or otherwise inappropriate identifications 206 of slack arm movement due to accidental or incidental movements of the relevant slack arm 44. For example, for a particular potentiometer 62, a slack arm movement may be identified 206 only if a change of at least ±0.1 volts in the signal from the potentiometer 62 is detected.

In certain implementations, identifying 206 slack arm movement may be viewed as a sort of trigger or threshold for calibration of a particular slack arm 44 (e.g., the slack arm 44a) by the SAC method 200. For example, the SAC method 200 may identify 202 a slack arm 44 for calibration based on an identified 206 movement of that slack arm 44, rather than an explicit (or pre-programmed) selection of that slack arm by an operator (or pre-set calibration routine). This may also be useful, for example, in order to ensure that accidental impact, vibration, or other unintended movement of a slack arm 44 does not result in improper calibration of that slack arm 44. For example, by requiring the identification 206 of a particular minimum amount of movement for a slack arm 44 (e.g., as indicated by a signal change exceeding a threshold amount) before the slack arm is identified 202 for calibration, the SAC method 200 may avoid attempting to calibrate slack arms 44 that have been slightly moved through accidental or incidental contact, but which are not intended to be calibrated at the current time.

Moreover, in a general calibration mode, in which any number of slack arms 44 may be calibrated in sets or in series, identifying 206 the movement of a particular slack arm 44 may provide a relatively easy and local way for an operator to cause the SAC method 200 to identify 202 the particular slack arm 44 of the set or series that is currently to be calibrated. For example, an operator may engage a general calibration mode of the SAC method 200 at a device within a cab of the baler 12 without selecting a particular slack arm or sequence of slack arms to be calibrated, travel from the cab to the baler 12, then manually move a particular slack arm 44 (e.g., the slack arm 44a) in order to cause the identification 202 of the slack arm 44 and thereby indicate that that this particular slack arm 44 is the current calibration target.

In certain implementations, an aural or visual indicator may be provided 204 in order to instruct an operator to move a particular slack arm 44 so that a slack arm movement may be appropriately identified 206 and that slack arm 44 calibrated. Similarly, in certain implementations, an indicator may be provided 204 in order to alert an operator that movement of a particular slack arm 44 has been identified 206 and, accordingly, that the particular slack arm 44 is being addressed by the SAC method 200 (e.g., that the slack arm 44 has been suitably identified 202). In certain implementations, both types of indicators (or others) may be provided 204. For example, display device 70 may display instructions indicating that the slack arm 44a has been identified 202 for calibration and directing an operator to move the slack arm 44a until the slack arm 44a is firmly urged against the upper stop 52a (or has reached another calibration location). A subsequently provided 204 indicator (e.g., a beep or other aural indicator), after the operator sufficiently moves the slack arm 44a (or another slack arm 44), may then alert the operator that appropriate (or inappropriate) movement of the slack arm 44a (or another slack arm 44) has been identified 206.

Once movement of a relevant slack arm 44 has been identified 206, the SAC method 200 may endeavor to identify that the slack arm 44 has been moved to an appropriate calibration position. Generally, as noted above, a calibration position may be a predetermined or preset orientation along the pivot range of a slack arm 44 that may serve as a reference location for calibration purposes. For example, a calibration position may be an upper or lower extremum of the pivot range of a slack arm 44, a notch or stop at another location along the pivot range, or one of various other locations.

Because the relevant slack arm 44 may not yet be calibrated, it may not be possible to accurately associate a particular identified 210 signal from an associated sensor with the slack arm 44 being oriented at a calibration position. The SAC method 200 may, however, essentially assume, if a slack arm is maintained at a particular position for at least a threshold time interval (e.g., 2 seconds, 5 seconds, and so on) after an initial movement of the slack arm 44 has been identified 206, that the slack arm is being maintained at a first particular calibration location. Accordingly, after identifying 206 a slack arm movement, the SAC method 200 may analyze identified 210 signals from the relevant slack arm sensor until it is determined 216 that the associated slack arm 44 has been maintained in a particular position for at least a particular time interval. The SAC method 200 may then treat this position, and the associated sensor signal (or average sensor signal over a relevant time interval), as corresponding to a first calibration position.

The SAC method 200 may determine 216 that a slack arm 44 has been maintained in a particular position based upon identifying 210 a steady voltage (or other) signal 218 from a relevant sensor (e.g., the potentiometer 62) over at least a predetermined time interval. Such a steady voltage (or other) signal 218 may be identified based upon the SAC method 200 determining that a voltage (or other) signal from a sensor has remained constant within a certain voltage (or other) band, over at least the predetermined amount of time, as may be consistent with a slack arm 44 being maintained in a relatively steady position (i.e., a first calibration position). In certain implementations, a steady voltage signal 218 may be identified 210 based on the SAC method 200 determining that a voltage from the potentiometer 62 has remained within a band of approximately ±0.2 volts for at least a particular time interval As depicted in FIG. 4A, the upper extremum of the pivotal motion of the slack arm 44a may correspond to a first calibration location for the slack arm 44a. As such, to facilitate calibration via the SAC method 200, the slack arm 44a may be moved upward along its pivot range until it is pressed against upper stop 52a. The slack arm 44a may then be held at that location for a predetermined amount of time (e.g., 2 seconds), with the SAC method 200 then utilizing the resulting steady voltage (or other) signal 218 from the potentiometer 62 to determine 216 that the slack arm 44a is being maintained at a steady position.

It will be understood that other implementations may be possible. For example, a reference notch or stop (not shown) below the upper stop 52*a* may be utilized as a calibration position, with the slack arm 44*a* being moved to (and maintained at) this reference notch or stop, rather than the upper stop 52*a*. Alternatively, another location along the pivot range of the slack arm 44*a* may be utilized as a first calibration location.

In certain implementations, a slack arm 44 may be moved to a calibration position, and maintained there, automatically (e.g., by an actuator configured to move the slack arm 44 to either extremum of its pivot range). In certain implementations, an operator may be instructed (or may otherwise know) to move a slack arm 44 to a particular calibration position and hold the slack arm 44 in that position for a particular amount of time. In certain implementations, the SAC method 200 may provide 204 an instruction to an operator (or an automated device) to move a particular slack arm 44 to a particular calibration position and to maintain the slack arm 44 in that position. In the implementation depicted in FIG. 4A, for example, upon initiation of the SAC method 200, upon identification 202 of the slack arm 44*a*, or upon the identification 206 of a first movement of the slack arm 44*a*, an operator may be provided 204 instructions to move the slack arm 44*a* to the upper limit of its pivot range (i.e., to urge the slack arm 44*a* against the upper stop 52*a*) and to hold the slack arm 44*a* in that position for at least 2 seconds. Based upon determining 216 that the slack arm 44*a* has been maintained in a particular position for more than 2 seconds, after an identified 206 initial movement of the slack arm 44*a*, the SAC method 200 may then determine, as appropriate, that this instruction has been followed and that calibration may proceed.

Determining 216 that a slack arm is being maintained at a calibration position based upon identifying 210 a voltage signal 218 that is steady over a predetermined amount of time may be useful to ensure that the slack arm 44*a* is deliberately and fully urged into the stop 52*a* (or appropriately held at another calibration location) for calibration. It may also may allow operators to move the slack arms 44 at various steady or unsteady rates during calibration, because the slack arms 44 may be calibrated based upon the determination 216 of steadily maintained positions, rather than the rate at which, or path by which, the slack arms 44 reach the steady state.

In various implementations, a predetermined time interval for the determination 216 of a maintained steady position may be selected based upon various considerations, including the need to avoid a false determination 216 of a steady state slack arm position, and the need to generally minimize the amount of time necessary for any given calibration. For example, too short of a predetermined time interval may lead to false determination 216 of a steadily maintained position if an operator hesitates for too long in moving a slack arm 44 to a target location or generally moves the slack arm 44 too slowly. In contrast, too long of a time interval may unnecessarily extend the total amount of time required to execute a particular calibration operation. In certain implementations, an appropriate predetermined time may be approximately 2 seconds, approximately 5 seconds, or some other time interval.

As with various other operations of the SAC method 200, it may be useful to provide 204 an aural or visual indicator upon the determination 216 of the slack arm 44*a* being maintained in position for a particular time interval. For example, with respect to the configuration of FIG. 4A, a beep or other signal may be provided 204 to alert an operator that the slack arm 44*a* has been maintained in one position (i.e., against the upper stop 52*a*) for an appropriate amount of time.

Having determined 216 that a slack arm 44 has been maintained in a particular position for a particular time interval, the SAC method 200 may then determine 220 a first calibration setting based upon the determined 216 maintained slack arm position. As also noted above, a calibration setting may be a stored value or set of values that associate a predetermined calibration position for a slack arm 44 with a particular identified 210 signal (or signal range) from an associated sensor, which value or set of values may be utilized (alone or in conjunction with other calibration settings) in order to identify a current slack arm position based upon a current sensor signal. In order to determine 220 a first calibration setting, the SAC method 200 may treat the voltage (or other) signal received from a relevant sensor when a slack arm 44 has been determined 216 as being maintained at a steady position as corresponding to a voltage (or other) signal from the sensor when the slack arm 44 is in a first predetermined calibration position (e.g., at a particular extremum of its pivot range). The voltage (or other) signal from this determined 216 maintained position may then be associated with the first calibration position in order to determine 220 a first calibration setting. A determined 220 calibration setting may be stored in various ways (e.g., in a memory architecture (not shown) associated with the controller 20) for later retrieval.

Referring again to FIG. 4A, for example, the first calibration setting may be determined 220 to include the slack arm position at the upper stop 52*a* and the voltage received from the potentiometer 62 when the slack arm 44*a* is determined 216 to have been maintained in place after an identified 206 initial slack arm movement. When the slack arm 44*a* has been maintained at the upper stop 52*a* for this determination 216, a first calibration setting for the slack arm 44*a* may accordingly be determined 202 as a set of values that includes the upper extremum position of the slack arm 44*a*, and an average steady voltage signal 218 associated with that position.

As above, various aural or visual indicators may be provided 204 to alert an operator to the determination 220 of a first calibration setting for a slack arm 44. For example, with respect to the configuration of FIG. 4A, a beep or other signal may be provided 204 to alert an operator that the upper calibration setting for the slack arm 44*a* has been determined 220. In certain implementations, the determination 216 that a slack arm 44 has been maintained in one position and the determination 220 of the first calibration setting may occur essentially simultaneously (or nearly simultaneously) and a single provided 204 indicator may be utilized to indicate both that the slack arm may be released from the maintained position and that the calibration setting has been determined 220.

With the first calibration setting having been determined 220, the SAC method 200 may continue in a similar fashion in order to determine 236 a second calibration setting for a slack arm 44. In certain implementations, a second calibration setting 236 may be determined for the identified 202 slack arm 44 (e.g., the slack arm 44*a*) immediately following determination 220 of the first calibration setting. In certain implementations, a different slack arm 44 may be identified 202 and a first calibration setting determined 220 for this different slack arm 44, before second calibration settings are determined 236 for both of the slack arms 44.

Generally, determining 236 the second calibration setting may include moving the identified 202 slack arm (e.g., slack arm 44*a*) to a different position from the determined 214 first calibration position. For example, if the slack arm 44*a* was moved (e.g., manually by an operator) to the upper stop 52*a* for determination 220 of a first calibration setting, the slack arm 44a may be moved (e.g., manually by an operator) to the lower stop bar 54a for determination 236 of the second calibration setting.

In other ways, however, determining 236 a second calibration setting may proceed relatively similarly to determining 206 a first calibration setting. For example, the SAC method 200 may include identifying 226 a second movement of the identified 202 slack arm 44a, which may prime the SAC method 200 for further operations addressing that slack arm 44. An identified 226 movement may be a movement in either of the pivot directions of a slack arm 44. Referring also to FIG. 4B, for example, where slack arm 44a has been identified 202 for calibration, and a calibration setting already determined 220 for the upper extremum of the slack arm's pivot range, the slack arm 44a may next be moved (e.g., manually by an operator) downward toward the stop bar 54a. This movement of the slack arm 44a may result in a voltage change 228 in an identified 210 signal from the potentiometer 62 (not shown in FIG. 4B), which may trigger the identification 226 of the slack arm movement and thereby set the SAC method 200 for further operations addressing the slack arm 44a.

In certain implementations, other movement of the slack arm 44a may additionally (or alternatively) be identified 226. For example, movement of the slack arm 44a may be identified 226 based upon an operator moving the slack arm 44a upward toward the upper stop 52a. This may be useful, for example, if the target calibration position is at the stop bar 54a, but the slack arm 44a is already urged into the stop bar 54a. In such a case the operator may, for example, move the slack arm 44a upward toward the upper stop 52a to allow identification 226 of the slack arm 44a for further calibration before the slack arm 44a is moved back toward the stop bar 54a.

In certain implementations, a slack arm movement may be identified 226 based upon identifying, in an identified 210 sensor signal, a voltage (or other) change 228 of at least a particular threshold amount, in order to avoid false, premature, or otherwise inappropriate identifications 226 of slack arm movement due to accidental or incidental movements of the relevant slack arm 44. For example, for a particular potentiometer 62, a slack arm movement may be identified 226 only if a change of at least ±0.1 volts in the identified 210 signal from the potentiometer 62 is detected.

In certain implementations, identifying 226 slack arm movement may be viewed as a sort of trigger or threshold for further calibration of a particular slack arm 44 (e.g., the slack arm 44a) by the SAC method 200, in order to ensure that accidental impact, vibration, or other unintended movement of a slack arm 44 does not result in improper calibration of that slack arm 44. For example, by requiring the identification 226 of a particular minimum amount of movement for a slack arm 44 (e.g., as indicated by a signal change exceeding a threshold amount) before further calibration of the slack arm 44 is attempted, the SAC method 200 may avoid attempting to further calibrate slack arms 44 that have been slightly moved through accidental or incidental contact, but which are not intended to be further calibrated at the current time.

Moreover, in a general calibration mode, in which any number of slack arms 44 may be calibrated in sets or in series, identifying 226 the movement of a particular slack arm 44 may provide a relatively easy and local way for an operator to cause the SAC method 200 to identify 202 the particular slack arm 44 that is currently to be further calibrated. For example, an operator may have engaged a general calibration mode of the SAC method 200 in order to calibrate a full set of slack arms 44 for the upper tensioning system 32, and first calibration settings may have been determined 220 for various of those slack arms. The operator may then manually move a particular slack arm 44 (e.g., the slack arm 44a) of those slack arms 44 for which first calibration settings 220 have already been determined, in order to identify that particular slack arm 44 as the current target for further calibration.

In certain implementations, an aural or visual indicator may be provided 204 in order to instruct an operator to move a particular slack arm 44 so that a slack arm movement may be appropriately identified 226 and that slack arm 44 further calibrated. Similarly, in certain implementations, an indicator may be provided 204 in order to alert an operator that movement of a particular slack arm 44 has been identified 226 and, accordingly, that the particular slack arm 44 is being addressed by the SAC method 200 for further calibration. In certain implementations, both types of indicators (or others) may be provided 204. For example, the display device 70 may display instructions directing an operator to move the slack arm 44a until the slack arm 44a is firmly urged against the stop bar 54a (or has reached another calibration location). A subsequently provided 204 indicator (e.g., a beep or other aural indicator), after the operator sufficiently moves the slack arm 44a (or another slack arm 44), may then alert the operator that appropriate (or inappropriate) movement of the slack arm 44a (or another slack arm) has been identified 226.

Once movement of a relevant slack arm 44 has been identified 226, the SAC method 200 may endeavor to identify that the slack arm 44 has been moved to an appropriate calibration position. As noted above, a calibration position may be a predetermined or preset orientation along the pivot range of a slack arm 44 that may serve as a reference location for calibration purposes. For example, a calibration position may be an upper or lower extremum of the pivot range of a slack arm 44, a notch or stop at another location along the pivot range, or one of various other locations.

Because the relevant slack arm 44 may not yet be fully calibrated, it may not be possible to accurately associate a particular signal from an associated sensor with the slack arm 44 being oriented at a calibration position. As also discussed above, however, the SAC method 200 may essentially assume, if a slack arm is maintained at a particular position for at least a threshold time interval (e.g., 2 seconds, 5 seconds, and so on), after an initial movement of the slack arm 44 has been identified 226, that the slack arm is being maintained at a second particular calibration location. Accordingly, after identifying 226 a slack arm movement, the SAC method 200 may analyze identified 210 signals from the relevant slack arm sensor until it is determined 232 that the associated slack arm 44 has been maintained in a particular position for at least a particular time interval. The SAC method 200 may then treat this position, and the associated sensor signal (or average sensor signal over a relevant time interval), as corresponding to a second calibration position.

The SAC method 200 may determine 232 that a slack arm 44 has been maintained in a particular position based upon identifying 210 a steady voltage (or other) signal 234 from a relevant sensor (e.g., the potentiometer 62) over at least a predetermined time interval. Such a steady voltage (or other) signal 234 may be identified 210 based upon the SAC method 200 determining that a voltage (or other) signal from a sensor has remained constant within a certain voltage (or other) band, over at least the predetermined amount of time, as may be consistent with a slack arm 44 being maintained in a relatively steady position (i.e., a second calibration position). In certain implementations, a steady voltage signal 234 may be identified 210 based on the SAC method 200 determining that a voltage from the potentiometer 62 has remained within a band of approximately ±0.2 volts for at least a particular time interval As depicted in FIG. 4B, the lower extremum of the pivotal motion of the slack arm 44a may correspond to a second calibration location for the slack arm 44a. As such, to facilitate calibration via the SAC method 200, the slack arm 44a may be moved downward along its pivot range until it is pressed against stop bar 54a. The slack arm 44a may then be held at that location for a predetermined amount of time (e.g., 2 seconds), with the SAC method 200 then identifying 210 the resulting steady voltage (or other) signal 234 from the potentiometer 62 and utilizing the signal to determine 232 that the slack arm 44a is being maintained at a steady position.

It will be understood that other implementations may be possible. For example, a reference notch or stop (not shown) above the stop bar 54a may be utilized as a calibration position, with the slack arm 44a being moved to (and maintained at) this reference notch or stop, rather than the stop bar 54a. Alternatively, another location further along the pivot range of the slack arm 44a may be utilized as a second calibration location.

In certain implementations, a slack arm 44 may be moved to a calibration position, and maintained there, automatically (e.g., by an actuator configured to move the slack arm 44 to either extremum of its pivot range). In certain implementations, an operator may be instructed (or may otherwise know) to move a slack arm 44 to a particular calibration position and hold the slack arm 44 in that position for a particular amount of time. In certain implementations, the SAC method 200 may provide 204 an instruction to an operator (or an automated device) to move a particular slack arm 44 to a particular calibration position and to maintain the slack arm 44 in that position. In the implementation depicted in FIG. 4B, for example, upon initiation of the SAC method 200, or upon the identification 226 of a second movement of the slack arm 44a, an operator may be provided 204 instructions to move the slack arm 44a to the lower limit of its pivot range (i.e., to urge the slack arm 44a against the stop bar 54a) and to hold the slack arm 44a in that position for at least 2 seconds. Based upon determining 232 that the slack arm 44a has been maintained in a particular position for more than 2 seconds, after an identified 226 initial movement of the slack arm 44a, the SAC method 200 may then determine, as appropriate, that this instruction has been followed and that the calibration may proceed.

Determining 232 that a slack arm is being maintained at a calibration position based upon identifying 210 a voltage signal 234 that has been steady for a predetermined amount of time may be useful to ensure that the slack arm 44a is deliberately and fully urged into the stop bar 54a (or appropriately held at another calibration location) for calibration. It may also may allow operators to move the slack arms 44 at various steady or unsteady rates during calibration, because the slack arms 44 may be calibrated based upon the determination 232 of steadily maintained positions, rather than the rate at which, or path by which, the slack arms 44 reach the steady state.

In various implementations, a predetermined time interval for the determination 232 of a maintained steady position may be selected based upon various considerations, including the need to avoid a false determination 232 of a steady state slack arm position, and the need to generally minimize the amount of time necessary for any given calibration. For example, too short of a predetermined time interval may lead to false determination 232 of a steadily maintained position if an operator hesitates for too long in moving a slack arm 44 to a target location or generally moves the slack arm 44 too slowly. In contrast, too long of a time interval may unnecessarily extend the total amount of time required to execute a particular calibration operation. In certain implementations, an appropriate predetermined time may be approximately 2 seconds, approximately 5 seconds, or some other time interval. In certain implementations, the predetermined time interval for determining 232 a second maintained position may be the same, or different, from the predetermined time interval for determining 216 a first maintained position.

As with various other operations of the SAC method 200, it may be useful to provide 204 an aural or visual indicator upon the determination 232 of the slack arm 44a being maintained in position for a particular time interval. For example, with respect to the configuration of FIG. 4B, a beep or other signal may be provided 204 to alert an operator that the slack arm 44a has been maintained in one position (i.e., against the stop bar 54a) for an appropriate amount of time.

Having determined 232 that a slack arm 44 has been maintained in a particular position for a particular time interval, the SAC method 200 may then determine 236 a second calibration setting based upon the determined 232 maintained slack arm position. As noted above, calibration setting may be a stored value or set of values that associate a predetermined calibration position for a slack arm 44 with a particular identified 210 signal (or signal range) from an associated sensor, which value or set of values may be utilized (alone or in conjunction with other calibration settings) in order to identify a current slack arm position based upon a current sensor signal. In order to determine 236 a first calibration setting, the SAC method 200 may treat the identified 210 voltage (or other) signal from a relevant sensor when a slack arm 44 has been determined 232 as being maintained at a steady position as corresponding to a voltage (or other) signal from the sensor when the slack arm 44 is in a second predetermined calibration position (e.g., at a particular extremum of its pivot range). The voltage (or other) signal from this determined 232 maintained position may then be associated with the second calibration position in order to determine 236 a first calibration setting. A determined 236 calibration setting may be stored in various ways (e.g., in a memory architecture (not shown) associated with the controller 20) for later retrieval.

Referring again to FIG. 4B, for example, the second calibration setting may be determined 236 to include the slack arm position at the stop bar 54a and the corresponding voltage received from the potentiometer 62 when the slack arm 44a is determined 232 to have been maintained in place after an identified 226 preceding slack arm movement. When the slack arm 44a has been maintained at the stop bar 54a for this determination 226, a second calibration setting for the slack arm 44a may accordingly be determined 232 as a set of values that includes the lower extremum position of the slack arm 44a, and an average steady voltage signal 234 associated with that position.

As above, various aural or visual indicators may be provided 204 to alert an operator to the determination 236 of a second calibration setting for a slack arm 44. For example, with respect to the configuration of FIG. 4B, a beep or other signal may be provided 204 to alert an operator that the lower calibration setting for the slack arm 44a has been determined 236. In certain implementations, the determination 232 that a slack arm 44 has been maintained in one position and the determination 236 of the second calibration setting may occur essentially simultaneously (or nearly simultaneously) and a single provided 204 indicator may be utilized to indicate both that the slack arm may be released from the maintained position and that the calibration setting has been determined 236.

With the first and second calibration settings having been determined 220 and 236, calibration of the slack arm 44*a* may be complete. During operation of the slack arm 44*a*, these determined 220, 236 settings may allow an accurate indicator of the current position of the slack arm 44*a* to be displayed 238 based upon signals from the potentiometer 62. For example, a linear or other extrapolation may be utilized to relate a voltage (or other) sensor signal at a present time to the two determined 220, 236 calibration settings, in order to determine a present position of the slack arm 44*a* that corresponds to that present signal. This present (or current) position may then be displayed 238 to an operator (or otherwise) in order to help an operator (or other agent) to assess the operational status of the slack arm 44*a*. Further, upon similar calibration of various other slack arms 44, accurate indicators of the current positions of those slack arms 44 may also be determined and displayed 238. In certain implementations, as depicted in FIG. 3, a bar graph representation of the current location of various slack arms 44 may be displayed on display device 70 for this purpose.

It will be understood that variations on the specific implementation described above may be possible. For example, various example operations of SAC method 200 have been described with respect to manual movement of a slack arm 44 by an operator. In certain implementations, however, automated movement of the slack arms 44 may be possible. Similarly, although various examples of the SAC method 200 refer to determining 220 and 230 calibration settings for extrema of slack arm pivot ranges, other implementations may be possible. Further, although various examples refer to determining 220 a calibration setting for an upper slack arm calibration position (e.g., against the upper stop 52*a*), then determining 230 a calibration setting for a lower slack arm calibration position (e.g., against the stop bar 54*a*), other implementations may be possible. For example, calibration settings may be determined 220 and 230 for two upper slack arm locations, two lower slack arm locations, a lower and then an upper slack arm location, and so on.

As will be appreciated by one skilled in the art, various aspects of the disclosed subject matter may be embodied as a computer-implemented method, a system, or a computer program product. Accordingly, certain implementations may be implemented entirely as hardware, entirely as software (including firmware, resident software, micro-code, etc.) or as a combination of software and hardware aspects. Furthermore, certain implementations may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced implementations herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A computer-implemented method of calibrating a tensioning system, the computer-implement method comprising:
    receiving, by the one or more computing devices, one or more signals from a sensor in communication with a slack arm;
    identifying, by the one or more computing devices, the slack arm for calibration;
    identifying, by the one or more computing devices, a first movement of the slack arm;
    determining, by the one or more computing devices, that the slack arm has been maintained in a first calibration position, after the identified first movement, for at least a first predetermined time interval;
    determining, by the one or more computing devices, a first calibration setting for the slack arm based upon, at least in part, the determined first calibration position;
    identifying, by the one or more computing devices, a second movement of the slack arm;
    determining, by the one or more computing devices, that the slack arm has been maintained in a second calibration position, after the identified second movement, for at least a second predetermined time interval;
    determining, by the one or more computing devices, a second calibration setting for the slack arm based upon, at least in part, the determined second calibration position; and
    determining, by the one or more computing devices, a current position of the slack arm throughout a range of motion during operation based upon, at least in part, at least one of the determined first and second calibration settings.

2. The computer-implemented method of claim 1, wherein one or more of the identifying of the first movement, the determining that the slack arm has been maintained in the first calibration position, the identifying of the second movement, and the determining that the slack arm has been maintained in the second calibration position is based upon, at least in part, the one or more signals from the sensor in communication with the slack arm.

3. The computer-implemented method of claim 2, wherein the sensor includes a potentiometer.

4. The computer-implemented method of claim 2, wherein the one or more signals includes a voltage change of at least a predetermined number of volts, and one or more of the first movement and the second movement is identified based upon, at least in part, the voltage change.

5. The computer-implemented method of claim 2, wherein the one or more signals includes a steady voltage signal deviating from a reference voltage by less than a predetermined number of volts for one of the first and the second predetermined time intervals; and
    wherein the determining that the slack arm has been maintained in one of the first calibration position and the second calibration position is based upon, at least in part, the steady voltage signal.

6. The computer-implemented method of claim 1, wherein at least one of the first predetermined time interval and the second predetermined time interval includes an interval of approximately two or more seconds.

7. The computer-implemented method of claim 6, wherein the at least one of the first predetermined time interval and the second predetermined time interval includes an interval of approximately five or more seconds.

8. The computer-implemented method of claim 1, further comprising:
    providing one or more of an aural indicator and a visual indicator based upon, at least in part, one or more of the identifying the slack arm for calibration, the identifying at least one of the first or second movements of the slack arm, the determining that the slack arm has been maintained in one of the first calibration position and the second calibration position, and the determining at least one of the first and second calibration settings.

9. The computer-implemented method of claim 1, further comprising:
    displaying, during operation of the tensioning system, an indicator of the determined current position of the slack arm.

10. The computer-implemented method of claim 1, wherein the first calibration position corresponds to a first extremum of movement of the slack arm when the slack arm is operationally mounted in the tensioning system and the second calibration position corresponds to a second extremum of movement of the slack arm when the slack arm is operationally mounted in the tensioning system.

11. A calibration system for a tensioning system, the calibration system comprising:
    a slack arm included in the tensioning system;
    a sensor device in communication with the slack arm;
    one or more processor devices coupled to one or more memory architectures, the one or more processor devices configured to:
    identify a first movement of the slack arm;
    determine that the slack arm has been maintained in a first calibration position, after the identified first movement, for at least a first predetermined time interval;
    determine a first calibration setting for the slack arm based upon, at least in part, the determined first calibration position;
    identify a second movement of the slack arm;
    determine that the slack arm has been maintained in a second calibration position, after the identified second movement, for at least a second predetermined time interval;
    determine a second calibration setting for the slack arm based upon, at least in part, the determined second calibration position; and
    determine a current position of the slack arm throughout a range of motion during operation based upon, at least in part, at least one of the determined first and second calibration settings.

12. The calibration system of claim 11, wherein one or more of the identifying of the first movement, the determining that the slack arm has been maintained in the first calibration position, the identifying of the second movement, and the determining that the slack arm has been maintained in the second calibration position is based upon, at least in part, identifying one or more signals from a sensor in communication with the slack arm.

13. The calibration system of claim 12, wherein the sensor includes a potentiometer.

14. The calibration system of claim 12, wherein the one or more signals includes a voltage change of at least approximately 0.1 volts, and one or more of the first movement and the second movement is identified based upon, at least in part, the voltage change.

15. The calibration system of claim 12, wherein the one or more signals includes a steady voltage signal deviating from a reference voltage by less than approximately 0.2 volts for one of the first and the second predetermined time intervals; and
wherein the determining that the slack arm has been maintained in one of the first calibration position and the second calibration position is based upon, at least in part, the steady voltage signal.

16. The calibration system of claim 11, wherein at least one of the first predetermined time interval and the second predetermined time interval includes an interval of approximately two or more seconds.

17. The calibration system of claim 16, wherein the at least one of the first predetermined time interval and the second predetermined time interval includes an interval of approximately five or more seconds.

18. The calibration system of claim 11, wherein the one or more processor devices is further configured to provide one or more of an aural indicator and a visual indicator based upon, at least in part, one or more of the identifying the slack arm for calibration, the identifying at least one of the first or second movements of the slack arm, the determining that the slack arm has been maintained in one of the first calibration position and the second calibration position, and the determining at least one of the first and second calibration settings.

19. The calibration system of claim 11, wherein the one or more processor devices is further configured to display, during operation of the tensioning system, an indicator of the determined current position of the slack arm.

20. The calibration system of claim 11, wherein the first calibration position corresponds to a first extremum of movement of the slack arm when the slack arm is operationally mounted in the tensioning system and the second calibration position corresponds to a second extremum of movement of the slack arm when the slack arm is operationally mounted in the tensioning system.

* * * * *